DISTRIBUTED AMPLIFIER TRANSMISSION LINE TERMINATIONS

Filed Dec. 30, 1952

INVENTOR
EMMETT H. BRADLEY

BY Hyman Hurvitz
ATTORNEY 2,778,887
Patented Jan. 22, 1957

2,778,887

DISTRIBUTED AMPLIFIER TRANSMISSION LINE TERMINATIONS

Emmett H. Bradley, Arlington, Va., assignor to Melpar, Inc., Alexandria, Va., a corporation of New York Application December 30, 1952, Serial No. 328,599

9 Claims. (Cl. 179—171)

The present invention relates generally to distributed amplifier transmission line terminations, and particularly to distributed amplifier line terminations having a low or zero D.-C. value and a relatively constant A.-C. impedance.

The problem giving rise to present invention is that of terminating a transmission line of a distributed amplifier, in such manner that the transmission line is terminated in its characteristic impedance over an extremely wide band of frequencies, say to 1000 mc., while presenting minimum D.-C. resistance, so that there will be negligible voltage loss between the B+ supply for the amplifier and the anodes of the amplifier tubes. This enables utilization of a B+ supply of relatively low power and voltage capacity, and contributes to the efficiency and economy of fabrication of the amplifier system as a whole. The usual termination for distributed amplifier transmission lines, heretofore, has been a conventional lumped resistance, which has a value at D.-C. equal to its value at moderately high frequencies, and is usually required to be of the order of 50 to 300 ohms. The tubes of a distributed amplifier are fed in parallel, for D.-C., and there is consequently a very considerable drain on the B+ source, via the terminating resistance, so that considerable voltage drop and power loss occurs therein, and the capacity and consequent cost of the B+ source is correspondingly increased.

As a further consideration, at extremely high frequencies, of the order of 500 mc. and above, the presence of a lumped resistance in a circuit introduces reflections, and capacities and inductances, generally indeterminate values. The impedance of lumped circuit elements of conventional character is therefore variable and difficult to calculate, at the ultra high frequencies, and the use of such resistors is to be avoided.

Briefly, in accordance with the present invention, a center conductor and a coaxial cylindrical conductor, both fabricated of metal, are provided with intermediate structure in the form of a lossy cylinder completely filling the space between the conductors. The lossy cylinder is composed of a right circular cone of low loss dielectric, specifically polystyrene, or the like, having a base equal in diameter to that of the cylindrical conductor, and a height equal to the height of the cylindrical conductor. The remainder of the cylinder is filled with a lossy material, specifically titanium dioxide, which is found to have the requisite high dielectric loss over a wide band of frequencies. The center conductor then constitutes a resistance of negligible value to D.-C., although it may be constructed of resistance wire, to have any value of resistance desired. High frequency signals applied to the inner conductor at the base of the polystyrene cone are attenuated by the lossy material, in a gradual and progressive manner in passing down the conductor, and the taper in the polystyrene cone is so selected that substantially no reflections occur over the band of frequencies to be absorbed. The length of the cone determines the lower limit of frequency response, so that inevitably the termination cannot operate over the band D.-C. to ultra-high frequency. However, the structure does provide for highly effective operation to frequencies above 1000 mc. and can be designed for frequencies down to about 50 mc. without becoming unduly bulky.

As a further improvement the inner conductor of the device may be helically wound, thereby to increase the lower operating range for a given physical length of cylinder, and the outer conductor in such case, may be solid, or itself a helix.

It is, accordingly, an object of the present invention to provide a novel termination for a distributed amplifier.

It is a further object of the invention to provide a wide band high frequency termination for a distributed amplifier, the termination having slight or no D.-C. resistance.

It is a further object of the invention to provide a load for a vaccuum tube operating in the ultra high frequency region, the load having a flat impedance characteristic over the band, and negligible or small D.-C. resistance.

It is a more specific object of the invention to provide a co-axial load or termination capable of being connected in circuit with a vacuum tube, having negligible D.-C. resistance, and including a tapered internal structure fabricated of lossy material to provide a flat impedance characteristic over a wide band of ultra high frequencies.

It is still another object of the invention to provide an improved high frequency energy absorbent unit having negligible D.-C. resistance and high loss over a wide band of high frequencies, the unit being constructed to minimize reflections over the band.

It is a further object of the present invention to provide an improved high frequency energy absorbent unit, of short physical length relative to its lowest operating frequency, and comprising co-axial metallic elements having interposed tapered lossy material, at least one of the metallic elements being helically wound to increase its effective electrical length.

The above and still further features, objects and advantages of the present invention will become apparent upon consideration of the following detailed description of specific embodiments thereof, especially when taken in conjunction with the accompanying drawings, wherein.

Figure 1:
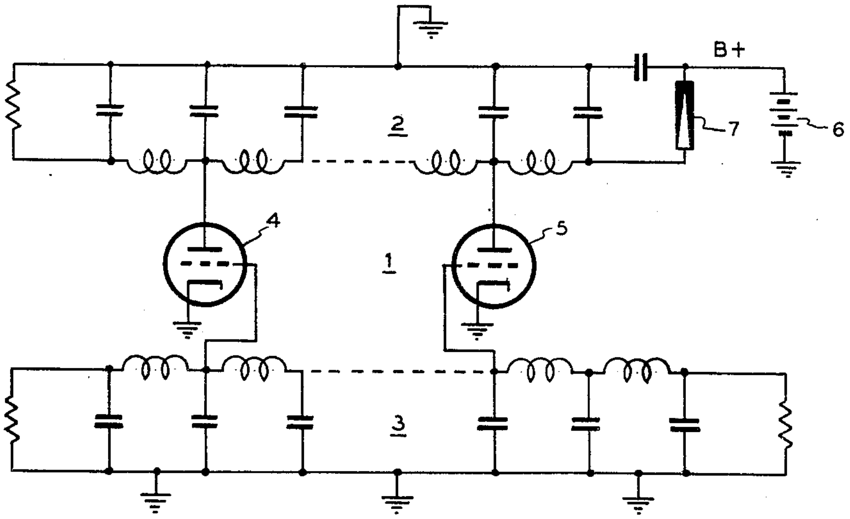
Figure 1 is a schematic circuit diagram of a distributed amplifier, terminated by a low D.-C., high A.-C. impedance termination constructed in accordance with the invention.

Referring now more specifically to Figure 1 of the accompanying drawings, the reference numeral 1 identifies generally a conventional distributed amplifier, having a plate line 2, a grid line 3, and a plurality of vacuum tubes, as 4, 5, distributed along the lines 2, 3. This structure is per se conventional.

A B+ source 6 is connected in series with the plate line and with a termination 7, constructed in accordance with the present invention.

It is the function of the termination 7 to match the impedance of the plate transmission line 2 over the desired pass band of the amplifier 1, so that energy traveling down the line 2 toward the termination 7, will be completely absorbed in the termination, and so that no reflection from the termination will occur. In accordance with the prior art the termination 7 has been a lumped resistance which possesses about the same impedance for D.-C. as it possesses for ultra high frequency. Since the resistance value of the termination 7 is in the range 50–300 ohms, for amplifiers of various design, and since the tubes, as 4, 5, may be considerable in number, there would be a very considerable D.-C. drain on the B+ source 6 to the conventional termination, and the source 6 must then be built to accommodate the drain.

In accordance with the present invention a termination is employed which possesses a D.-C. resistance which is negligible, yet a resistance at high frequencies which is of the value desired. Thereby the line 2 is properly terminated for the operating frequencies of the amplifier 1, yet the D.-C. loss in the termination is negligible, and the B+ source 6 may be economically fabricated. Two specific forms of termination, in accordance with the invention, are illustrated in Figures 2 and 3 of the accompanying drawing.

Figure 2:
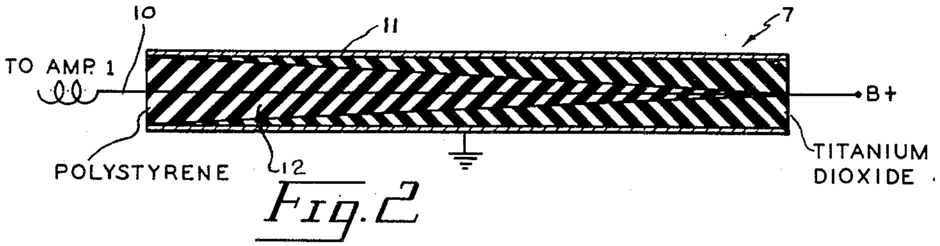
Figure 2 is a view in axial section of a termination in accordance with the invention, and indicating the mode of connection of the termination into a distributed amplifier.

Referring now to Figure 2 of the drawings, the reference numeral 10 identifies a metallic rod, of cylindrical cross section and small diameter. Co-axial with the rod 10 is an encompassing right circular cylinder 11, fabricated of metal, such as copper. Intermediate the rod 10 and the cylinder 11 is a filler consisting of a right circular cone 12, having a base 13 of diameter equal to the inner diameter of cylinder 11, and a height equal to the height of the cylinder 11. The rod 10 passes through the axis of the cone 12 and externally thereof at either end. The remaining space internally of the cylinder 11 is occupied by a filler of titanium dioxide, the latter being found to have a high dielectric loss which is relatively constant over a wide range of high frequencies, say from about 25 to about 1000 mc., and above.

The cylinder 11 is grounded, and the inner conductor 10 connected with the B+ source 6 of the amplifier, adjacent to the apex of the cone 12. The alternate end of the rod 10 is connected to the plate line 2 of the amplifier. By extension of length of cone 12, it is found that the low frequency roll-off of the termination may be controlled, and lower frequencies are absorbed in a longer cone 12. The extreme upper limit of the termination has not been investigated.

Figure 3:
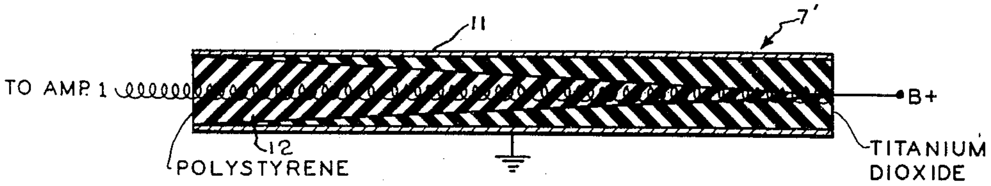
Figure 3 is a like view of a modification of the system of Figure 2.

Since the low frequency roll-off of the termination 7, of Figure 2, is a function of the length of rod 10 which is internal of the polystyrene cone 12, I have in the embodiment of my invention illustrated in Figure 3 of the accompanying drawings, extended the lower frequency limit of the device for a given physical length thereof, by coiling the inner conductor 10 of Figure 2 into helical form, thus to increase its delay time for a given physical length.

While I have described and illustrated my invention as embodied in a specific structure, variations of the details and general arrangement may be resorted to without departing from the true spirit and scope of the invention as defined in the appended claims.

What is claimed is:

1. In combination, a distributed amplifier having a plurality of vacuum tubes each having an anode and having a transmission line and means for connecting said transmission line to said anodes at points of various delay along said line, said line having a predetermined characteristic impedance, a source of anode voltage for said vacuum tubes, and a matching impedance interposed between said transmission line and said source, said impedance comprising an elongated co-axial transmission line structure having relatively small reflection and a relatively flat resistance characteristic over a wide ultra high frequency band, and having negligible resistance to direct current.

2. The combination in accordance with claim 1 wherein said matching impedance is a co-axial transmission line section having an inner conductor and an outer co-axial cylinder and having a conical structure of low loss insulating material located co-axially of said inner conductor and having a high dielectric loss material interposed between said conical structure and the inner wall of the outer co-axial cylinder, said source of anode voltage connected to said inner conductor adjacent the apex of said conical structure, and said transmission line connected to said inner conductor adjacent the base of said conical structure.

3. The combination in accordance with claim 2 wherein said high dielectric loss material is titanium dioxide.

4. In combination, a distributed amplifier having a plurality of vacuum tubes each having an anode and having a transmission line and means for connecting said transmission line to said anodes at points of various delay along said line, said line having a predetermined characteristic impedance, a source of anode voltage for said vacuum tubes, and a matching impedance interposed between said transmission line and said source, said impedance comprising an elongated structure having relatively small reflection and a relatively flat resistance characteristic over a wide ultra high frequency band, and having negligible resistance to direct current, said elongated structure including an elongated conductor of negligible resistance in series with said anodes, an internally tapered structure of high frequency lossy material surrounding said conductor, and out of contact with said conductor along most of its length and a conductive sheath surrounding said tapered structure of high frequency lossy material and in contact therewith along its entire effective length, said conductive sheath connected to a point of reference potential.

5. In an amplifier for amplying frequencies including ultra high frequencies, a vacuum tube having an anode, a source of anode voltage, and a load connected intermediate said anode and said source of anode voltage, said load including an elongated conductor of negligible D.-C. resistance connected in series between said anode and said source of anode voltage, an elongated internally tapered structure of high frequency lossy material surrounding said conductor and out of contact therewith along most of its length, and a conductive sheath surrounding said tapered structure and in contact therewith along substantially its entire effective length, said sheath connected to a point of reference potential.

6. In an amplifier for amplifying frequencies including ultra high frequencies, a vacuum tube having an anode, a source of anode voltage, and a load connected between said anode and said source of anode voltage, said load including a length of co-axial transmission line having an inner conductor, an outer conductive sheath and a lossy dielectric material therebetween, said inner conductor connected in series between said anode and said source of anode voltage and said conductive sheath connected to a point of reference potential.

7. In combination, an amplifier having at least one amplifier tube having an anode, a source of anode voltage for said amplifier tube, and an impedance interposed between said source and said anode, said impedance comprising a co-axial transmission line section having an inner conductor and an outer co-axial cylinder and having a conical structure of dielectric material interposed between said inner conductor and said co-axial cylinder, said source of anode voltage connected to said inner conductor only at a point adjacent the apex of said conical structure.

8. An amplifier including an amplifier tube having an anode, a transmission line load having reactance and having a predetermined characteristic impedance, a source of anode voltage, a matching impedance, a series circuit including said source of anode voltage, said matching impedance, said transmission line load and said anode, in sequence, said matching impedance consisting of a co-axial transmission line section having a center conductor in said series circuit, an outer co-axial conductor connected to a point of reference potential, and a solid dielectric insulator of tapering cross-length taken along the length said center conductor, said solid dielectric insulator interposed between said center conductor and said outer co-axial conductor.

9. The combination in accordance with claim 8 wherein said dielectric material is titanium dioxide.

References Cited in the file of this patent

UNITED STATES PATENTS

| | | |
|---|---|---|
| 2,481,456 | Tyzzer | Sept. 6, 1949 |
| 2,579,751 | Muchmore | Dec. 25, 1951 |
| 2,593,948 | Wiegand et al. | Apr. 22, 1952 |
| 2,665,339 | Leng | Jan. 5, 1954 |

FOREIGN PATENTS

| | | |
|---|---|---|
| 460,562 | Great Britain | Jan. 25, 1937 |

OTHER REFERENCES

Article: "Distributed amplification," by Ginzton et al., Proceedings of the I. R. E., August 1948, pp. 956–969.

Article: "200 mc traveling-wave chain amplifier," by Rudenberg et al., Electronics, December 1949, pp. 106–109.